Patented June 17, 1941

2,246,485

UNITED STATES PATENT OFFICE 2,246,485

GAUGING APPARATUS

Willis Fay Aller, Dayton, Ohio, assignor to The Sheffield Corporation, a corporation of Ohio Application May 14, 1940, Serial No. 335,114

6 Claims. (Cl. 33—178)

This invention relates to gauging apparatus and more particularly to apparatus adapted to accurately measure or gauge a diametric dimension of a workpiece.

One object of the invention is the provision of a gauging apparatus of simple construction for very accurately gauging the diameter of the race of an antifriction bearing member.

Another object of the invention is the provision of a gauging apparatus for gauging the diameter of a workpiece, the gauging apparatus including a movable ball or roller retainer which can be adjusted from a position in which the balls are retracted from the work into a position in which the balls engage the work, one of the balls operating a gauging member which is operably mounted on the support that carries the ball retainer.

Another object of the invention is the provision of a gauging apparatus having a movable ball or roller retainer so arranged that the work is engaged with and carried by one of the balls of a ball retainer and accurately held by the balls themselves in an exact position for the gauging operation.

Another object of the invention is the provision of a gauging apparatus for gauging the internal ball race diameter of an outer ball race, so arranged as to facilitate the positioning of the ball race on the gauge and providing an accurate gauging operation through ball contacts which are interposed between the ball race, the gauging member of the gauging apparatus and the support on which the balls are carried.

Other objects and advantages of the invention will be apparent from the following description, the appended claims, and the accompanying drawing.

In the drawing,

Fig. 1 is a top plan view of gauging apparatus embodying the present invention;

Fig. 2 is a vertical section on the line 2—2 of Fig. 1;

Fig. 3 is an end view of the gauging apparatus;

Fig. 4 is a top plan view of an end portion of the gauging apparatus shown partly in section with the ball retainer in retracted or loading position; and Fig. 5 is a vertical section on the line 5—5 of Fig. 2.

In the drawing, in which the preferred embodiment of the invention has been illustrated as a gauging apparatus for gauging the internal diameter of an outer ball race, 10 generally designates a support, provided with a longitudinally extending mounting base 11 adapted to be detachably supported on the anvil portion 12 of a gauging device such, for example, as the device disclosed in Patent 2,159,343 granted May 23, 1939, in which there is suitable indicating mechanism operated by a gauging plunger 13 which is axially movable in a suitable housing provided with amplifying means so that an indication of the position of the plunger 13 will be accurately shown on the gauging device.

Operably mounted on the support 10 is a gauging member 15, movable in accordance with the size of the workpiece being gauged, and serving to transmit the motion from an end portion adjacent the work position to a hardened plate 16 against which the plunger 13 of the gauging device is pressed. As shown, the gauging member 15 is an elongated bar secured to two flexible spring blades 17 by means of a clamp block 18, these blades diverging outwardly and downwardly to points of attachment on the support 10. An adjustable stop screw 19 limits the swinging movement of the bar in a clockwise direction, and a spring 20 normally urges the bar clockwise and holds it up against the gauging plunger 13. The stop 19 is so positioned that there will be a suitable space between it and the upper side of the bar 15 when the latter is positioned to give a zero indication on the indicating device operated by the plunger 13.

Suitably connected to the block 10, as by means of screws 21, is a block extension providing an arbor 22 projecting horizontally and having a slot 23 in which the outer end of the bar 15 is movable. The arbor is provided with a cylindrical surface 24 which slidably supports a roll retainer 25 having several sockets 26 which receive steel rolls or balls 27, 28, 29 and 30. The outer ends of the sockets in which the balls are received are slightly smaller in diameter than the ball diameter as will be apparent from Fig. 4, to keep the balls from moving out of the sockets, the sockets being so formed as to permit free radial inward movement when the ball retainer is moved from a gauging position shown in Fig. 2 to a retracted or loading position as shown in Fig. 4. This inward movement of the balls is permitted by the outward tapering or frustoconical surface 32 of the outer portion of the arbor. Hardened steel blocks 33 are inserted in the arbor at the locations of the balls 27, 28 and 29 for these balls to ride against as the retainer is moved from loading to gauging position. In its gauging position the end of the ball retainer 25 abuts against a stop surface 35 on the supthe race diameter of a workpiece being gauged, a roller retainer carried by said work supporting part for axial movement thereon from a loading position to a gauging position and having roller receiving sockets, rollers in said sockets adapted to engage and carry the race being gauged, said arbor having an outwardly tapering portion providing for radially outward movement of the rollers as the retainer is moved to gauging position on the support, said gauging member having a surface engaged by one of said rollers and moved thereby in accordance with the inside diameter of the race being gauged.

5. A gauge of the character described comprising a support, a gauging member operably mounted thereon for movement in accordance with a diameter of a workpiece being gauged, a ball retainer adjustably mounted on the support and movable from a loading position to a gauging position, balls held by said retainer and adapted for engagement with the workpiece being gauged, one of the balls engaging and operating the gauging member and a diametrically opposite ball bearing on the support and carrying the weight of the workpiece, said ball retainer having a stop surface for engagement with the side of the workpiece and so located with respect to the ball centers as to have a clearance spacing from the side of the workpiece during the gauging operation, said support having a tapering portion for moving the balls into contact with the workpiece as the ball retainer is moved to gauging position.

6. A gauge of the character described for gauging the internal diameter of an outer ball race comprising a support, a gauging member pivotally mounted thereon for movement in accordance with the ball race diameter of a workpiece being gauged, a ball retainer adjustably mounted on the support and axially movable from a loading position to a predetermined gauging position, four balls held substantially 90° apart by said retainer and adapted for engagement with the ball race of the workpiece being gauged, one of the balls engaging and operating the gauging member and a diametrically opposite ball at the top of the retainer bearing on the support and carrying the weight of the workpiece, said ball retainer having a stop surface for engagement with the side of the workpiece and so located with respect to the ball centers as to have a clearance spacing from the side of the workpiece during the gauging operation, said support having a tapering portion for moving the balls into contact with the workpiece as the ball retainer is moved to gauging position.

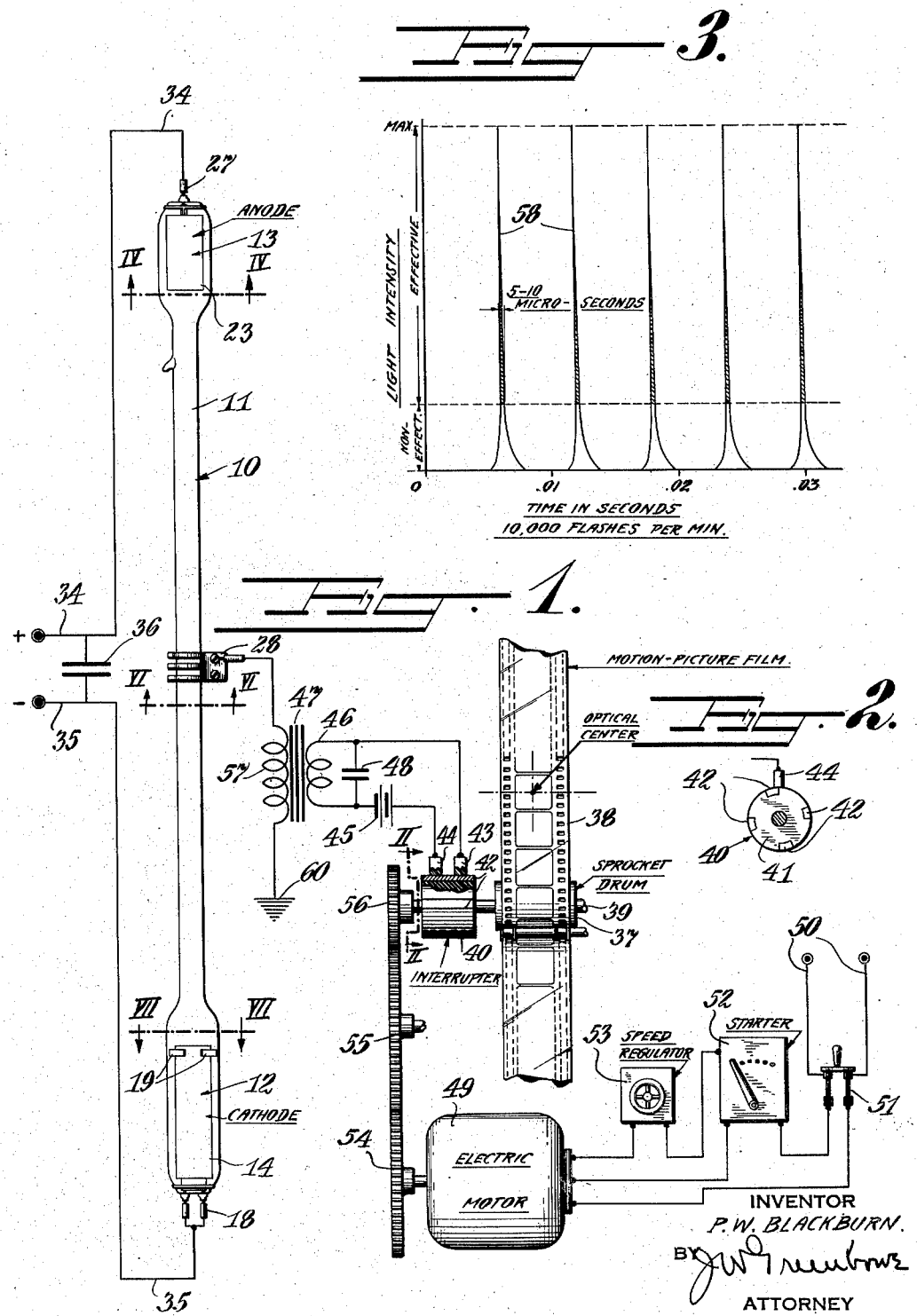

WILLIS FAY ALLER.